(12) United States Patent
Ishida et al.

(10) Patent No.: US 7,324,147 B2
(45) Date of Patent: Jan. 29, 2008

(54) INTERMITTENT DRIVING TYPE IMAGING DEVICE FOR PORTABLE TERMINAL

(75) Inventors: Kozo Ishida, Tokyo (JP); Tetsuya Kuno, Tokyo (JP); Koichi Yamashita, Tokyo (JP); Hiroaki Sugiura, Tokyo (JP); Takashi Itow, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 824 days.

(21) Appl. No.: 10/259,452

(22) Filed: Sep. 30, 2002

(65) Prior Publication Data

US 2003/0189660 A1    Oct. 9, 2003

(30) Foreign Application Priority Data

Apr. 5, 2002    (JP) .......................... P2002-103504

(51) Int. Cl.
*H04N 3/14*    (2006.01)
*H04N 5/335*   (2006.01)

(52) U.S. Cl. ...................... 348/312; 348/295; 348/296; 348/317

(58) Field of Classification Search ................ 348/295, 348/296, 311, 312, 317, 322
See application file for complete search history.

(56) References Cited

U.S. PATENT DOCUMENTS

| 5,606,366 | A  | * | 2/1997 | Hieda et al. ................. 348/297 |
| 6,340,989 | B1 |   | 1/2002 | Oda |
| 6,593,967 | B1 | * | 7/2003 | McGarvey et al. ......... 348/312 |

| 2001/0010553 | A1 |   | 8/2001  | Tanaka et al. |
| 2002/0140844 | A1 | * | 10/2002 | Kurokawa et al. .......... 348/362 |

FOREIGN PATENT DOCUMENTS

| EP | 0 859 509 A2 | 2/1998 |
| EP | 1017230 A2   | 12/1999 |
| JP | 6-97414 A    | 4/1994 |
| JP | 7-298142 A   | 11/1995 |
| JP | 9-282898 A   | 10/1997 |
| JP | 10-228522 A  | 8/1998 |
| JP | 2000-78481 A | 3/2000 |
| JP | 224473 A     | 8/2000 |

* cited by examiner

*Primary Examiner*—Lin Ye
*Assistant Examiner*—Kelly Jerabek
(74) *Attorney, Agent, or Firm*—Birch, Stewart, Kolasch & Birch, LLP

(57) ABSTRACT

An imaging system controller (5) outputs a control signal (VC). The control signal (VC) gives a command to output driving clocks ($\phi Vn$, $\phi Hm$) of an imaging element (1) in a signal transmission period, and a command to suspend output of the clocks ($\phi Vn$, $\phi Hm$) in an idle period subsequent to the signal transmission period. The length of the idle period is a multiple of the length of the signal transmission period by a natural number. The imaging system controller (5) periodically repeats output of the control signal (VC) giving these commands a number of times corresponding to the number of horizontal lines of the imaging element (1). In response to the commands of the control signal (VC), a timing generator (2) generates and outputs the clocks ($\phi Vn$, $\phi Hm$), and suspends generation and output of the same. An imaging device (10) thereby intermittently drives the imaging element (1), to generate and output a picked-up image signal (V2).

12 Claims, 9 Drawing Sheets

FIG. 3
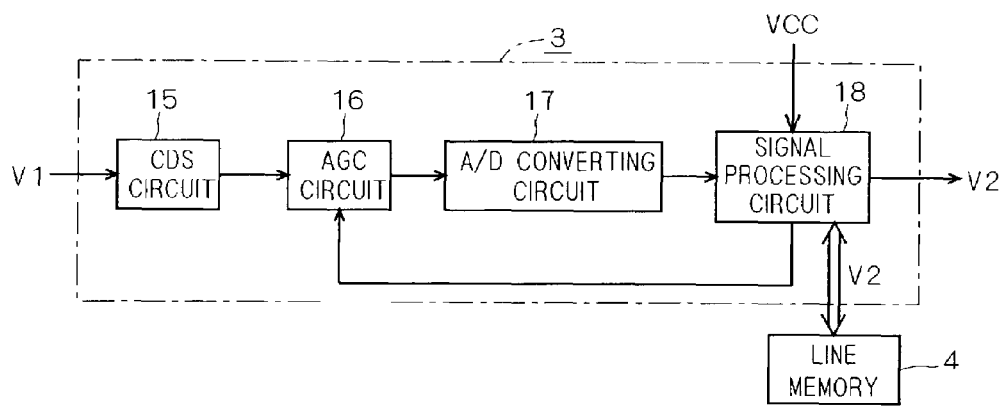
FIG. 4A ϕV1
FIG. 4B ϕV2
FIG. 4C ϕV3
FIG. 4D ϕV4
FIG. 4E ϕH1
FIG. 4F ϕH2

WRITING CLOCK SIGNAL
Ckwh

READING CLOCK SIGNAL
Ckrh $(tr = n \times tw)$

WRITING CLOCK SIGNAL
Ckwf

READING CLOCK SIGNAL
Ckr1f(n=1)

READING CLOCK SIGNAL
Ckr2f(n≫1)

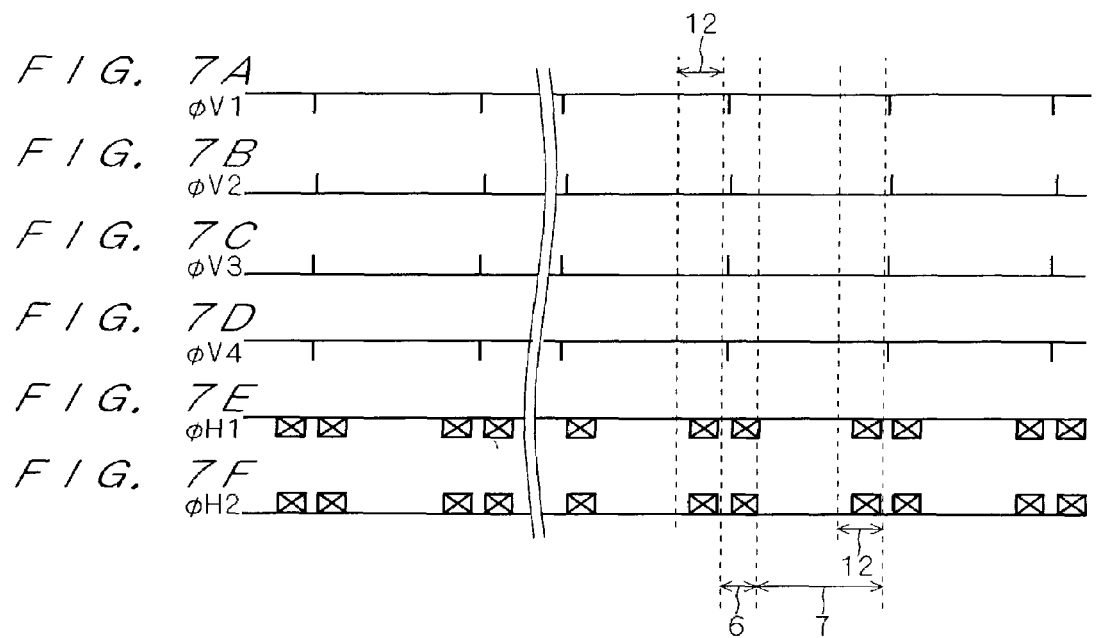
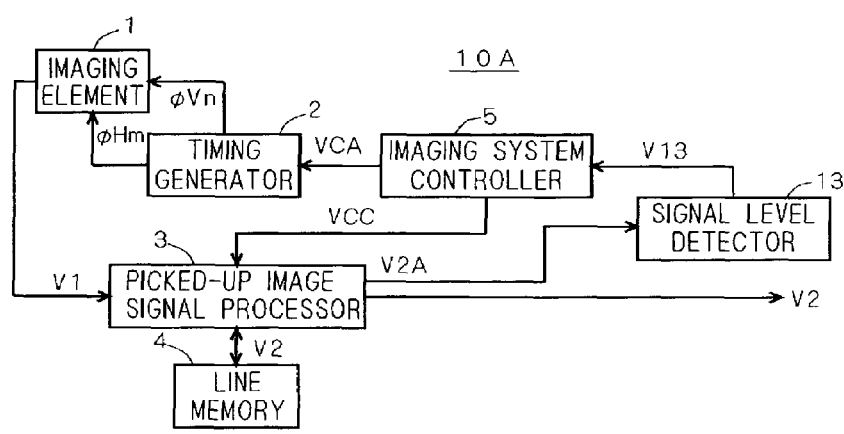

FIG. 14 (PRIOR ART)
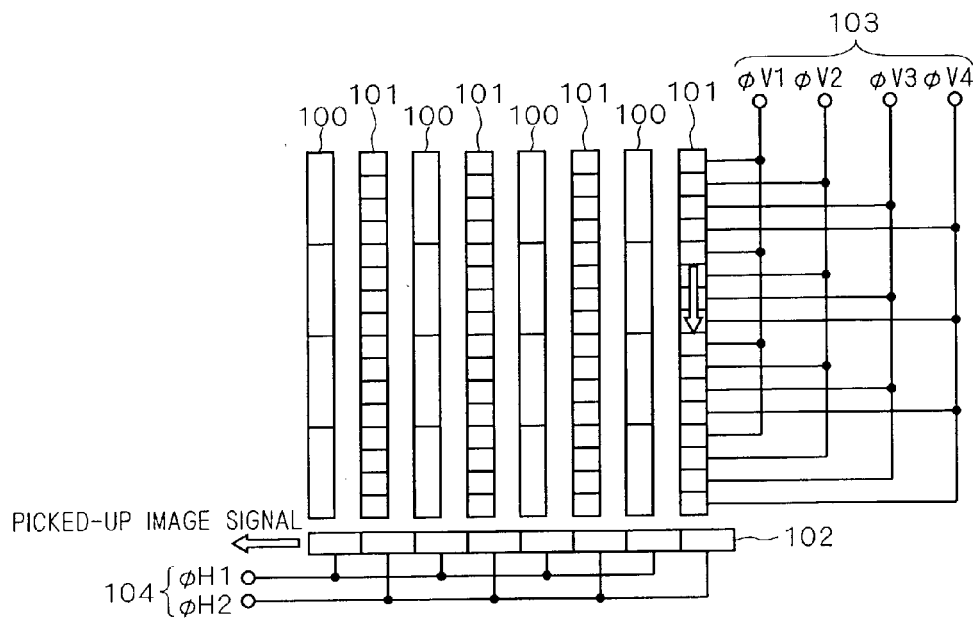
(PRIOR ART)
FIG. 15A φV1
FIG. 15B φV2
FIG. 15C φV3
FIG. 15D φV4
FIG. 15E φH1
FIG. 15F φH2
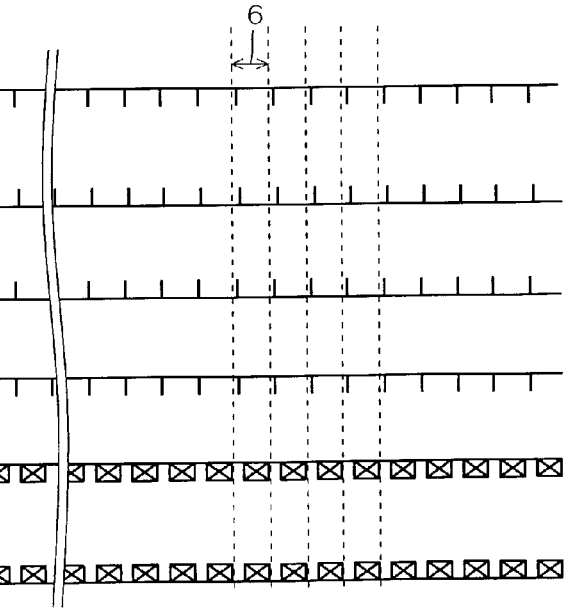

INTERMITTENT DRIVING TYPE IMAGING DEVICE FOR PORTABLE TERMINAL

This non-provisional application claims priority under 35 U.S.C. 119(a) on patent application Ser. No. 2002-103504 filed in JAPAN on Apr. 5, 2002, which is herein incorporated by reference.

BACKGROUND OF THE INVENTION

1. Field of the Invention

The present invention relates to a technique for improving signal-to-noise (S/N) performance of an imaging device in a shooting under low-intensity light conditions. More particularly, it relates to a compact imaging device preferably usable in combination with a portable terminal such as an information device or a portable phone.

2. Description of the Background Art

FIG. 14 illustrates the structure of an inline transfer CCD generally used as a solid state imaging element (prior art). In FIG. 14, reference numeral 100 denotes a photosensitive section for performing photoelectric conversion of brightness of a subject image (incident light), numeral 101 denotes a vertical transfer section for reading charges generated and accumulated at the photosensitive section 100, and transferring the same in a vertical direction, and numeral 102 is a horizontal transfer section for transferring the charges of a picked-up image signal vertically transferred from the vertical transfer section 101 in a horizontal direction, and taking out the same as a picked-up image signal. Further, reference numeral 103 collectively denotes vertical transfer clocks $\phi V1$, $\phi V2$, $\phi V3$ and $\phi V4$ for driving the vertical transfer section 101, and numeral 104 collectively denotes horizontal transfer clocks $\phi H1$ and $\phi H2$ for driving the horizontal transfer section 102.

FIGS. 15A through 15F illustrate an exemplary timing chart of the transfer clocks in the inline transfer CCD given in FIG. 14 (prior art). The accumulated charges read out into the vertical transfer section 101 from the photosensitive section 100 are transferred in a vertical direction (in a direction of a downward-pointing arrow in FIG. 14) to be timed to the vertical transfer clocks $\phi V1$, $\phi V2$, $\phi V3$ and $\phi V4$ at a starting point of a signal transmission period 6. As a result, the accumulated charges at a bottom end of the vertical transfer section 101 are vertically transferred to the horizontal transfer section 102.

To be timed to the horizontal transfer clocks $\phi H1$ and $\phi H2$, the accumulated charges in the horizontal transfer section 102 are transferred in a horizontal direction (in a direction of a leftward-pointing arrow in FIG. 14), and then outputted as a picked-up image signal to an external CDS circuit (not shown). This CDS circuit thereafter performs sampling on the signal of the received accumulated charges.

FIG. 16 is a block diagram illustrating the configuration of an imaging device introduced in Japanese Patent Application Laid-Open No. 2000-224473. In this device, incident light passing through a lens 105 is converted into a video signal by a CCD 106. The video signal is then sampled by a CDS circuit 107 and inputted to a low-intensity light detecting circuit 115. When a subject is in low-intensity light conditions, the low-intensity light detecting circuit 115 outputs a low-intensity light signal. An ALC circuit 114 controls an aperture of the lens 105. After passing through an AGC circuit 108, the video signal is converted into a digital video signal by an A/D converting circuit 109. A signal combining circuit 110 combines three or more digital video signals corresponding to adjacent pixels, and thereafter, performs division in such a manner that a resultant gain is more than 1. When the subject is in low-intensity light conditions, the signal combining circuit 110 outputs the result therein in response to the control by a gain-up control circuit 116. A signal processing circuit 111 performs predetermined signal processing on the video signal. After passing through a D/A converting circuit 112, the video signal is then outputted from an encoding circuit 113.

As described, the conventional imaging device has a signal processing circuit using a signal combining circuit for combining adjacent pixels and a divider circuit. As a result, the conventional imaging device has a problem involving reduction in S/N ratio on a displayed image obtained by a shooting under low-intensity light conditions.

Further, the conventional imaging device performs gain-up control of a digital signal obtained after A/D conversion, thus resulting in a problem of loss of bit information.

SUMMARY OF THE INVENTION

It is therefore an object of the present invention to realize a system allowing improvement in S/N ratio even in a shooting under low-intensity light conditions. It is still an object of the present invention to realize a system requiring no significant change in controlling factors, such as horizontal transfer clock frequency and phase control, for each shooting condition such as low-intensity light condition.

A first aspect of the present invention is intended for an imaging device including an imaging element, a picked-up image signal processor, an imaging system controller, and a timing generator. The imaging element accumulates charges obtained by photoelectric conversion of incident light providing an image of a subject, transmits accumulated charges to an output terminal in response to a vertical transfer clock and a horizontal transfer clock, and outputs the accumulated charges from the output terminal. The picked-up image signal processor has an input terminal connected to the output terminal of the imaging element, and an output terminal. The picked-up image signal processor performs predetermined signal processings on the accumulated charges received at the input terminal thereof, and outputs a resultant signal as a picked-up image signal from the output terminal thereof. The imaging system controller has an output terminal. The imaging system controller outputs a control signal from the output terminal thereof. The control signal gives a command to generate and output the vertical transfer clock and the horizontal transfer clock in a signal transmission period, a command to suspend output of the vertical transfer clock an the horizontal transfer clock in an idle period subsequent to the signal transmission period, and a command to periodically repeat the signal transmission period and the idle period a number of times corresponding to the number of horizontal lines of the imaging element. The timing generator has an input terminal connected to the output terminal of the imaging system controller, and an output terminal connected to the imaging element. The timing generator generates and outputs the vertical transfer clock and the horizontal transfer clock from the output terminal thereof in the signal transmission period, and suspends output of the vertical transfer clock and the horizontal transfer clock in the idle period in response to the control signal received at the input terminal thereof. The length of the idle period is n times (n is a natural number) the length of the signal transmission period.

The present invention employs an intermittent driving system capable of controlling a frame period to have a long length. As compared with a normal driving system requiring only the signal transmission period to drive the imaging element, the imaging element is allowed to accumulate charges spending frame time period of a length that is at least twice the length in the normal driving system. As a result, signal amplification by an amplifier is not required, thus leading to improvement in S/N ratio.

A second aspect of the present invention is intended for an imaging device including an imaging element, a picked-up signal processor, an imaging system controller, a timing generator, and a signal level detector. The imaging element accumulates charges obtained by photoelectric conversion of incident light providing an image of a subject, transmits accumulated charges to an output terminal in response to a vertical transfer clock and a horizontal transfer clock, and outputs the accumulated charges from the output terminal. The picked-up image signal processor has an input terminal connected to the output terminal of the imaging element, and first and second output terminals. The picked-up image signal processor performs predetermined signal processings on the accumulated charges received at the input terminal thereof, and outputs a resultant signal as a picked-up image signal from the first output terminal thereof. The picked-up image signal processor further outputs a signal from the second output terminal thereof. This signal is obtained in the course of the predetermined signal processings, and required for determining brightness level of the subject. The imaging system controller has an input terminal and an output terminal. The imaging system controller has an input terminal and an output terminal. The imaging system controller outputs a control signal from the output terminal thereof. The control signal gives a command to generate and output the vertical transfer clock and the horizontal transfer clock in a signal transmission period, a command to suspend output of the vertical transfer clock and the horizontal transfer clock in an idle period subsequent to the signal transmission period, and a command to periodically repeat the signal transmission period and the idle period as a number of times corresponding to the number of horizontal lines of the imaging element. The timing generator has an input terminal connected to the output terminal of the imaging system controller, and an output terminal connected to the imaging element. The timing generator generates and outputs the vertical transfer clock and the horizontal transfer clock from the output terminal thereof in the signal transmission period, and suspends output of the vertical transfer clock and the horizontal transfer clock in the idle period in response to the control signal received at the input terminal thereof. The signal level detector has an input terminal connected to the second output terminal of the picked-up image signal processor, and an output terminal connected to the input terminal of the imaging system controller. The signal level detector detects the brightness level of the subject on the basis of the signal received at the input terminal thereof, and outputs a result of detection from the output terminal thereof. The length of the idle period is n times (n is an integer of 0 or more) the length of the signal transmission period. The imaging system controller controls the length of the idle period on the basis of the result of detection received at the input terminal thereof.

A time period for accumulating charges in the imaging element can be thus controlled. More particularly, this time period is extended in a shooting under low-intensity light conditions, and is shortened under high-intensity light conditions.

A third aspect of the present invention is intended for an imaging device including an imaging element, picked-up signal processing means, imaging system control means, and timing generating means. The imaging element accumulates charges obtained by photoelectric conversion of incident light providing an image of a subject, transmits accumulated charges to an output terminal in response to a vertical transfer clock and a horizontal transfer clock, and outputs the accumulated charges from the output terminal. The picked-up image signal processing means has an input terminal connected to the output terminal of the imaging element, and an output terminal. The picked-up image signal processing means performs predetermined signal processings on the accumulated charges received at the input terminal thereof, and outputs a resultant signal as a picked-up image signal from the output terminal thereof. The imaging system control means has an output terminal. The imaging system control means outputs a control signal from the output terminal thereof. The control signal gives a command to generate and output the vertical transfer clock and the horizontal transfer clock in a signal transmission period, a command to suspend output of the vertical transfer clock and the horizontal transfer clock in an idle period subsequent to the signal transmission period, and a command to periodically repeat the signal transmission period and the idle period a number of times corresponding to the number of horizontal lines of the imaging element. The timing generating means has an input terminal connected to the output terminal of the imaging system control means, and an output terminal connected to the imaging element. The timing generating means generates and outputs the vertical transfer clock and the horizontal transfer clock from the output terminal thereof in the signal transmission period, and suspends output of the vertical transfer clock and the horizontal transfer clock in the idle period in response to the control signal received at the input terminal thereof. The length of the idle period is n times (n is a natural number) the length of the signal transmission period.

The present invention employs an intermittent driving system capable of controlling a frame period to have a long period of time. As compared with a normal driving system requiring only the signal transmission period to drive the imaging element, the imaging element is allowed to accumulate charges spending time of a length that is at least twice the length in the normal driving system. As a result, signal amplification by an amplifier is not required, thus leading to improvement in S/N ratio.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram illustrating the internal configuration of a picked-up image signal processor shown in FIG. 1;

FIGS. 4A through 4F illustrate a timing chart of transfer clocks according to the first preferred embodiment of the present invention;

FIG. 6A shows a writing clock and FIGS. 6B and 6C show reading clocks, each provided for the line memory;

FIGS. 7A through 7F illustrate a timing chart showing the waveform of each transfer clock in a dummy transmission period;

FIG. 8 is a block diagram illustrating the configuration of an imaging device according to a second preferred embodiment of the present invention;

FIG. 14 schematically illustrates the structure of a solid state imaging element (inline transfer CCD);

FIGS. 15A through 15F respectively illustrate an exemplary timing chart of transfer clock in the inline transfer CCD;

DESCRIPTION OF THE PREFERRED EMBODIMENTS

First Preferred Embodiment

According to the subject matter of the first preferred embodiment of the present invention, an intermittent driving method of a solid state imaging element (hereinafter referred to simply as an imaging element) such as a CCD is suggested. This intermittent driving method requires the following: (1) in a signal transmission period, charges accumulated in all the pixels belonging to one horizontal line of the imaging element are transferred to an output terminal of the imaging element; (2) in an idle period (having a length that is a multiple of the length of the signal transmission period by a natural number) subsequent to the signal transmission period, no transfer of accumulated charges belonging to the next horizontal line is to occur; and (3) the signal transmission period and idle period are periodically repeated a number of times corresponding to the number of horizontal lines of the imaging element. The details of the first preferred embodiment will be discussed on the basis of the accompanying drawings.

Figure 1:
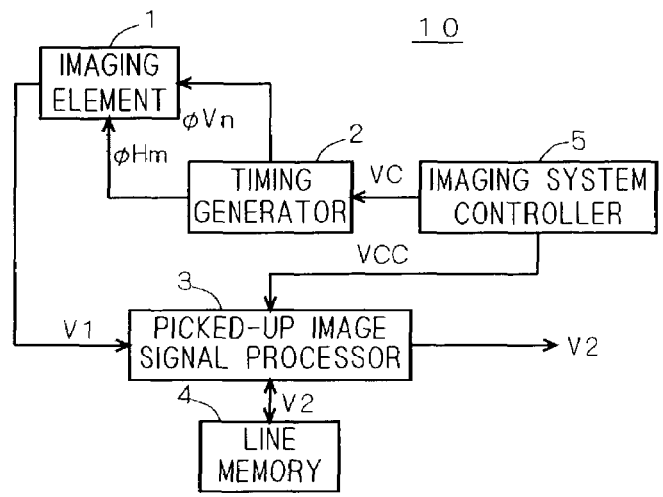
FIG. 1 is a block diagram illustrating the configuration of an imaging device according to a first preferred embodiment of the present invention.

FIG. 1 is a block diagram illustrating the system configuration of an imaging device 10 according to the first preferred embodiment. In FIG. 1, an imaging element 1 performs photoelectric conversion of incident light for providing a subject image, and accumulates charges obtained after conversion in corresponding pixels of each horizontal line. To be timed to a vertical transfer clock φVn and a horizontal transfer clock φHm, the imaging element 1 also sequentially transfers the charges accumulated in each of the pixels belonging to one horizontal line to an output terminal thereof, and thereafter outputs the accumulated charges from the output terminal. The exemplary structure of the imaging element 1 is shown in FIG. 2.

Figure 2:
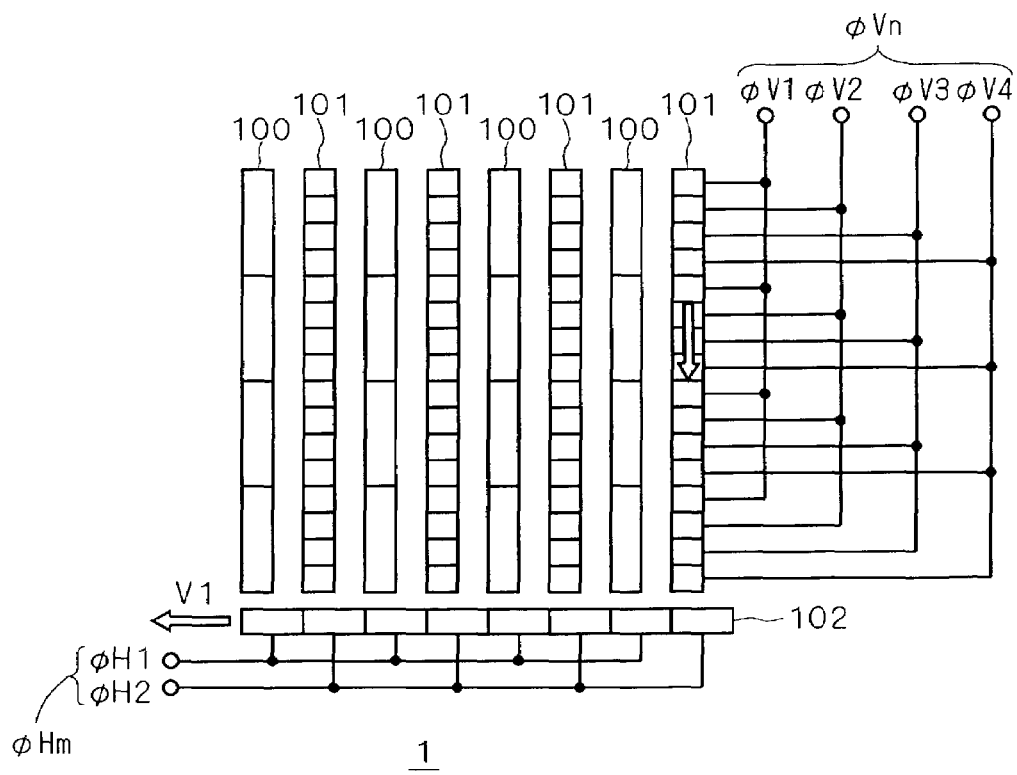
FIG. 2 is a block diagram schematically illustrating the structure of an imaging element shown in FIG. 1.

The structure given in FIG. 2 is the same as given in FIG. 14 as discussed above. The photosensitive section 100 is corresponding to a plurality of pixels arranged along one horizontal line. In this structure, the photosensitive section 100 includes four pixels for performing photosensitive conversion of incident light. To be timed to the vertical transfer clocks φV1 through φV4, the vertical transfer section 101 reads charges accumulated in each pixel belonging to the corresponding horizontal line, and sequentially transfer the accumulated charges to the horizontal transfer section 102 in a vertical direction (in a direction of a downward-pointing arrow in FIG. 2) (vertical transfer). Further, the horizontal transfer section 102 receives the accumulated charges sequentially transferred thereto, and transfers the same to the output terminal in response to the timing of the horizontal transfer clocks φH1 and φH2 (horizontal transfer).

In FIG. 1, a timing generator 2 has an input terminal connected to a first output terminal of a to-be-described imaging system controller 5, and an output terminal connected to an input terminal of the imaging element 1. In response to a command of a control signal VC, the timing generator 2 supplies the vertical transfer clock φVn and the horizontal transfer clock φHm to the vertical transfer section 101 and to the horizontal transfer section 102 of the imaging element 1, respectively.

A picked-up image signal processor 3 has a first input terminal connected to the output terminal of the imaging element 1, a second input terminal connected to a second output terminal of the imaging system controller 5, a data writing and reading terminal, and an output terminal. The picked-up image signal processor 3 receives accumulated charges V1 outputted from the imaging element 1, and performs predetermined signal processings on the signal V1. The configuration of the picked-up image signal processor 3 is shown in FIG. 3. As seen from FIG. 3, the picked-up image signal processor 3 includes a CDS circuit 15 for performing a signal processing (sampling) on the accumulated charges V1 received from the imaging element 1, an AGC circuit 16 for amplifying the signal received from the CDS circuit 15, an A/D converting circuit 17 for converting the output from the AGC circuit 16 into a digital signal, and a signal processing circuit 18 for processing the output from the A/D converting circuit 17 into a signal of a format optimally suitable for a camera.

A line memory 4 is connected to the data writing and reading terminal of the picked-up image signal processor 3. To be timed to a writing and reading clock signal VCC, the line memory 4 temporarily stores a picked-up image signal (digital signal) V2, that is obtained from the foregoing predetermined signal processings, for each line.

The imaging system controller 5 is a core section of the imaging device 10 which manages schedules such as a readout time period of the accumulated charges in a direction of each horizontal line of the imaging element 1 and the number of horizontal lines of the imaging element 1, and includes a counter (not shown) therein. The imaging system controller 5 controls generation and output of the vertical transfer clock φVn and the horizontal transfer clock φHm at the timing generator 2, and writing and reading of the picked-up image signal V2 by the picked-up image signal processor 3 to and from the line memory 4.

FIGS. 4A through 4F illustrating a timing chart of the transfer clocks φVn (n is an integer ranging from 1 to 4) and φHm (m indicates either 1 or 2) outputted from the timing generator 2. On the basis of the readout time period required for transferring all the accumulated charges belonging to one horizontal line of the imaging element 1 to the output terminal of the imaging element 1 (the readout time period corresponding to a signal transmission period 6 to be described later), the imaging system controller 5 controls generation and output of the transfer clocks φVn and φHm at the timing generator 2. In FIGS. 4A through 4F, reference numeral 6 denotes a signal transmission period for transmitting data belonging to one horizontal line, and numeral 7 denotes an idle period in which no transmission of data belonging to k horizontal lines (k is a natural number) occurs. As an example, in the first preferred embodiment, the idle period 7 is a period in which no transmission of data belonging to three horizontal lines occurs. The ratio in length between the periods 6 and 7 is determined by the imaging system controller 5.

The operations of the imaging device 10 shown in FIG. 1 will be described next. First, the imaging system controller 5 is operable (1) to predetermine the lengths of the signal transmission period 6 and the idle period 7 on the basis of the readout time period of all the accumulated charges V1 belonging to one horizontal line of the imaging element 1, and then, (2) to generate the control signal VC giving the following commands in response to the time counted by the counter therein, and output the control signal VC from its output terminal to the timing generator 2. The commands given from the control signal VC includes (i) a command to generate and output the vertical transfer clock φVn and the horizontal transfer clock φHm in the signal transmission period 6, (ii) a command to suspend output of both the vertical transfer clock φVn and the horizontal transfer clock φHm in the idle period 7 subsequent to the signal transmission period 6, and (iii) a command to periodically repeat a frame period 8 including the signal transmission period 6 and the idle period 7 (see FIG. 6) a number of times corresponding to the number of horizontal lines of the imaging element 1. Here, the length of the idle period 7 is k times (k is a natural number) the length of the signal transmission period 6.

In response to the commands of the control signal VC, the timing generator 2 generates and outputs the vertical transfer clock φVn and the horizontal transfer clock φHm from its output terminal in the signal transmission period 6, and suspends output of the vertical transfer clock φVn and the horizontal transfer clock φHm in the idle period 7. The timing generator 2 periodically repeats these operations in response to the commands of the control signal VC.

The detailed description of the imaging device 10 will be given below on the basis of FIGS. 4A through 4F. First, in order to read out all the charges V1 belonging to one horizontal line accumulated at the imaging element 1, the imaging system controller 5 controls the timing generator 2 so as to transmit the transfer clocks φV1 through φV4, φH1 and φH2 to the input terminal of the imaging element 1 in the signal transmission period 6. Upon receipt of this control by the imaging system controller 5, the timing generator 2 outputs the transfer clocks φV1 through φV4, φH1 and φH2 to drive the imaging element 1. The accumulated charges V1 are thus read out from the imaging element 1 and transmitted to the picked-up image signal processor 3, at which the signal V1 undergo predetermined signal processings. As a result, the picked-up image signal V2 is obtained.

In the subsequent period corresponding to one horizontal line, no readout of the charges accumulated in the pixels belonging to the next horizontal line of the imaging element 1 is to occur. Therefore, the imaging system controller 5 controls the timing generator 2 so as to suspend output of the transfer clocks φV1 through φV4, φH1 and φH2. The timing generator 2 thus suspends output of the transfer clocks φV1 through φV4, φH1 and φH2 in this period. In the subsequent period corresponding to the next two horizontal lines, the imaging system controller 5 continues to control the timing generator 2 so as to suspend output of the transfer clocks φV1 through φV4, φH1 and φH2. The timing generator 2 thus continues to suspend output of the transfer clocks φV1 through φV4, φH1 and φH2 in this period corresponding to these two horizontal lines. The imaging system controller 5 periodically repeats such control of the signal transmission period 6 and the idle period 7 a number of times corresponding to the number of horizontal lines of the imaging element 1, namely, performs "intermittent driving". According to this intermittent driving method, all the accumulated charges corresponding to one screen of the picked-up image can be read out.

The intermittent driving method shown in FIGS. 4A through 4F produces the following effect. That is, in each transmission period, namely, in each idle period 7, charge accumulation simultaneously occurs in all the pixels of the photosensitive section 100 of the imaging element 1. Charges are thereby accumulated spending a period of a length that is four times (generally speaking, (k+1) times) the length of a frame time period in the normal driving method requiring only the signal transmission period as shown in FIG. 15. As a result, according to such intermittent driving method, signal amplification by an amplifier is not required, thus leading to improvement in S/N ratio. Especially in a shooting under low-intensity light conditions, degradation of S/N ratio on a displayed image is prevented.

In the exemplary timing chart given in FIGS. 4A through 4F, the signal transmission period 6 corresponds to a period of one horizontal line and the idle period 7 corresponds to a period of three horizontal lines. However, the idle period 7 is required to have at least the same length as that of the signal transmission period 6. In this case, the foregoing effect is also achieved.

Writing and reading of the picked-up image signal V2 to and from the line memory 4 in response to the writing and reading clock signal VCC will be described next.

Figure 6A:
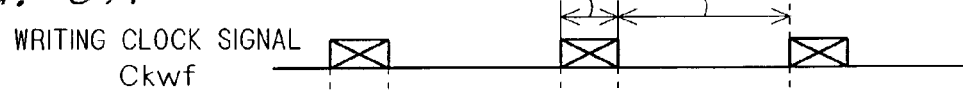
FIGS. 6A through 6C illustrate a timing chart when viewed with a frame period, and more particularly.
Figure 6B:
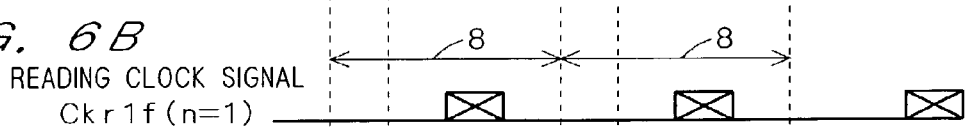

First, the imaging system controller 5 generates the "writing and reading clock signal VCC" giving commands to temporarily store the picked-up image signal V2 in the line memory 4 in the signal transmission period 6, and to start reading of the picked-up image signal V2 from the line memory 4 to be timed to an arbitrary instant in the frame period 8 (corresponding to the sum of the signal transmission period 6 and the idle period 7; see FIGS. 6A and 6B) and to finish this reading of the picked-up image signal V2 in the frame period 8. In response to the result of count (time) by the internal counter, the imaging system controller 5 outputs the writing and reading clock signal VCC from its second output terminal to the picked-up image signal processor 3.

To be timed to the writing and reading clock signal VCC, the picked-up image signal processor 3 (more particularly, the signal processing circuit 18 in FIG. 3) thereby performs writing and reading of the picked-up image signal V2 to and from the line memory 4.

Subject to the control as described, the data V2 temporarily stored in the line memory 4 within the signal transmission period 6 can be taken out to be timed to an arbitrary instant by the end of the idle period 7 in the frame period 8 including this signal transmission period 6. As a result, timing for reading the picked-up image signal V2 can be easily determined.

Further, the imaging device 10 requires only the adjustment between the timing for reading the data from the line memory 4 and the timing for reading the charges from the imaging element 1, eliminating the necessity to provide a field memory having a capacity corresponding to the number of all the pixels of the imaging element 1. In view of this, the imaging device 10 is also advantageously applicable in terms of cost, mounting area and weight.

Figure 5A:
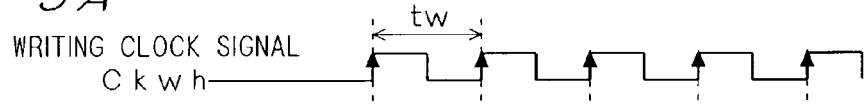
FIGS. 5A and 5B illustrate a timing chart of a write clock and a read clock for a line memory.
Figure 5B:
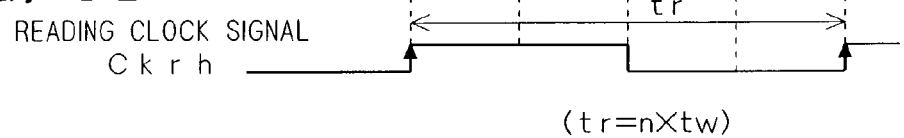
Figure 6C:

The exemplary timing for data writing and data reading to and from the line memory 4 will be described below. FIGS. 5A and 5B illustrate a timing chart showing waveforms of a writing clock signal Ckwh and a reading clock signal Ckrh provided for the line memory 4 in relation to a period tw of the writing clock signal Ckwh. Further, FIGS. 6A through 6C illustrate a timing chart showing timing of a writing clock signal Ckwf and reading clock signals Ckr1f, Ckr2f in relation to the frame period 8. The writing clock signal Ckwh (Ckwf) and the reading clock signal Ckrh (Ckr1f, Ckr2f) are collectively referred to as the writing and reading clock signal VCC.

The writing clock signal Ckwh shown in FIG. 5A has a frequency (1/tw). The reading clock signal Ckrh for the line memory 4 has a frequency (1/tr=1/(n×tw)). Here, n is an integer of not less than 1. In FIG. 5B, n is defined as 4.

The waveform of the writing clock signal Ckwf shown in FIG. 6A corresponds to the waveform of the writing clock signal Ckwh in FIG. 5A when viewed with the frame period 8. The output period of the writing clock signal Ckwf is the same as the signal transmission period 6. Further, under the condition of n=1, namely, when the reading clock signal Ckrh is in synchronization with the writing clock signal Ckwh and has the same period as that of the writing clock signal Ckwh, the waveform of the reading clock signal Ckr1f shown in FIG. 6B is obtained by controlling the phase of the reading clock signal Ckrh in FIG. 5B. More particularly, the waveform of the reading clock signal Ckr1f is obtained by delaying the reading clock signal Ckrh relative to the writing clock signal Ckwh by a period of time longer than the signal transmission period 6. Further, the waveform of the reading clock signal Ckr1f is viewed with the frame period 8. Instead of the exemplary clock signal shown in FIG. 6B, the reading clock signal may be the signal Ckr2f in FIG. 6C. Under the condition of n>>1, the waveform of the reading clock signal Ckr2f is obtained by controlling the phase of the reading clock signal Ckrh in FIG. 5B. More particularly, the waveform of the reading clock signal Ckr2f is obtained by delaying the reading clock signal Ckrh relative to the writing clock signal Ckwh by a period of time corresponding to the signal transmission period 6. Further, the waveform of the reading clock signal Ckr2f is viewed with the frame period 8.

As seen from FIGS. 6B and 6C, the phase may be controlled to such an extent that timing for starting an output period of the reading clock signal viewed with the frame period 8 is shifted to the idle period 7. Or alternatively, as seen from FIG. 5B, the phase may be controlled with clock period within the signal transmission period 6.

Still alternatively, the writing clock signal and the reading clock signal for the line memory 4 may be asynchronous to each other.

In the imaging device 10, even in the case of a shooting under low-intensity light conditions accompanying a frame period of a relatively long period of time, or in the case when a subject is in high-intensity light conditions such as shooting in the daytime accompanying a frame period of a relatively short period of time, the same horizontal clock φHm is applicable as a driving clock (clock for reading accumulated charges) of the imaging element 1 to be outputted only in the signal transmission period 6. Therefore, in the imaging device 10, the adjustment of a black sample-and-hold pulse signal, a signal sample-and-hold pulse signal, an A/D clock signal and the like, which are supplied to the CDS circuit 15 and the A/D converting circuit 17 of the picked-up image signal processor 3, is not required for each frame period at all. As a result, the imaging device 10 does not require a memory therein having an adjusted value for each arbitrary frame period. Further, the black sample-and-hold pulse signal and the signal sample-and-hold pulse signal can be shared in the picked-up image signal processor 3, thus fixing the relation in phase between these pulses and the horizontal transfer clock φHm and eventually, preventing degradation of S/N ratio.

Modification of the First Preferred Embodiment

The modification of the first preferred embodiment characteristically requires the following: (1) in a dummy transmission period 12 (see FIG. 7A), the imaging system controller 5 outputs the control signal VC which further commands to generate and output only the horizontal transfer clock φHm; and (2) in response to the command of this control signal VC received in the dummy transmission period 12, the timing generator 2 generates and outputs only the horizontal clock signal φHm in the dummy transmission period 12. The dummy transmission period 12 is provided in the idle period 7 and immediately before the signal transmission period 6 following this idle period 7.

FIGS. 7A through 7F illustrate a timing chart showing the waveform of each transfer clock when the imaging system controller 5 generates and outputs the control signal VC which commands to generate and output only the horizontal transfer clock φHm in the dummy transmission period 12. Here, the dummy transmission period 12 is a period provided in the idle period 7 immediately before a certain signal transmission period 6, ending immediately before this signal transmission period 6.

After the vertical transfer clocks φV1 through φV4 are applied to the vertical transfer section 101 of the imaging element 1 and then the vertical transfer section 101 transfers charges accumulated in the pixel belonging to a certain horizontal line into the horizontal transfer section 102, the horizontal transfer clocks φH1 and φH2 are applied to the horizontal transfer section 102 to thereby drive the same. The accumulated charges V1 are thereby taken out from the output terminal of the imaging element 1. On receipt of a command from the imaging system controller 5 to perform dummy transmission, the timing generator 2 suspends output of the vertical transfer clocks φV1 through φV4, and outputs only the horizontal transfer clocks φH1 and φH2 to drive only the horizontal transfer section 102 in the dummy transmission period 12.

According to this dummy transmission to be performed immediately before the signal transmission, noise such as dark current accumulated in the horizontal transfer section 102 can be horizontally transferred, thus eliminating charges caused by residual current noise. It is therefore allowed to effectively transfer only the accumulated charges in the signal transmission period 6 subsequent to the dummy transmission period 12. As a result, accumulated charges can be transferred with higher S/N ratio.

Second Preferred Embodiment

The second preferred embodiment of the present invention is the improvement of the first preferred embodiment, characteristically requiring the following. That is, a signal obtained in one of a plurality of signal processings in the picked-up image signal processor 3 or the picked-up image signal V2 which is a digital signal is detected, and then the ratio in length between the signal transmission period and the idle period is controlled according to the level of the detected signal, namely, to the brightness level of a subject image.

FIG. 8 is a block diagram illustrating the system configuration of an imaging device 10A according to the second preferred embodiment. The distinctive features of the imaging device 10A from the imaging device 10 shown in FIG. 1 lie in the picked-up signal processor 3, a signal level detector 13 and the imaging system controller 5. In the following, only the description of these constituent elements 3, 13 and 5 will be given. Regarding the other elements, the description in the first preferred embodiment is to be further applied in the second preferred embodiment.

As seen from FIG. 8, the picked-up image signal processor 3 has a first input terminal connected to the output terminal of the imaging element 1, a second input terminal for receiving the writing and reading clock signal VCC, a first output terminal for outputting the picked-up image signal V2, and a second output terminal. More particularly, the picked-up image signal processor 3 outputs a signal V2A, which is obtained in the course of predetermined signal processings on the accumulated charges V1, from its second output terminal. The signal V2A is used to determine brightness level of the subject image.

The signal level detector 13 has an input terminal connected to the second output terminal of the picked-up image signal processor 3, and an output terminal connected to the input terminal of the imaging system controller 5. More particularly, on receipt of the signal V2A received at the input terminal, the signal level detector 13 detects brightness level of the subject image, and outputs a result of detection V13 from the output terminal.

On the basis of the result of detection V13 received at the input terminal, the imaging system controller 5 of the second preferred embodiment adjusts the length of the idle period 7. More particularly, the imaging system controller 5 controls the ratio in length between the signal transmission period 6 and the idle period 7 so that the length of the idle period 7 is n times (n is an integer of 0 or more) the length of the signal transmission period 6. When n=0, the image element 1 is driven by the normal driving method.

The detailed operations of the signal V2A and the signal level detector 13 will be discussed below.

The signal level detector 13 detects the level of the signal V2A outputted from the picked-up image signal processor 3. When the subject image is determined to have a relatively high brightness level on the basis of the detected signal level, the imaging system controller 5 sets the idle period 7 to have a length shorter than its current length in response to this brightness level. A frame frequency is thus increased, leading to the shortened period of the frame period 8. Charges are thereby accumulated in the imaging element 1 within a shorter period of time. As a result, saturation of charges can be suppressed.

On the other hand, when the signal level detector 13 determines the image to be in low-intensity light conditions on the basis of the detected signal level, the imaging system controller 5 controls the foregoing ratio so that the idle period 7 should be always provided (when the method shifts from the normal driving to the intermittent driving), or alternatively, the idle period 7 has a length longer than the current one (when the imaging element 1 has been already driven by the intermittent method). A frame frequency is thus decreased and charges are accumulated in the imaging element 1 spending a longer period of time. As a result, the amount of accumulated charges can be increased.

Figure 9:
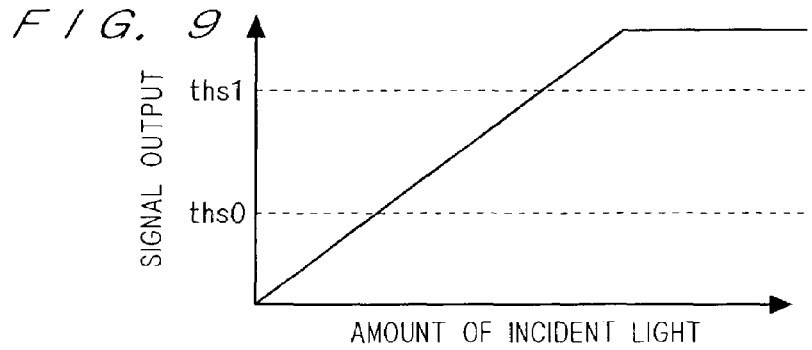
FIG. 9 is a graph showing the waveform of signal output relative to brightness (the amount of incident light)

With reference to FIG. 9, the exemplary way of determining brightness level will be discussed by using the output signal from the CDS circuit 15 illustrated in FIG. 3 as the signal V2A. FIG. 9 shows the signal output from the CDS circuit 15. As the amount of light incident on the imaging element 1 increases, the output data from the CDS circuit 15 continues to increase until it reaches a saturation level from the point of the certain amount of incident light onward. The characteristic shown in FIG. 9 differs depending on the system configuration.

As shown in FIG. 9, the signal level detector 13 has two threshold values ths1 and ths0 with respect to the output signal from the CDS circuit 15. The state where the output signal from the CDS circuit 15 ranges between the threshold values ths1 and ths0 is defined as a standard state for adjusting the idle period 7. For example, in this state, the imaging system controller 5 sets the ratio in length between the signal transmission period 6 and the idle period 7 to be 1:1. In this case, when the output signal from the CDS circuit 15 relative to the amount of incident light reaches a value that is equal to or more than the threshold value ths1, the signal level detector 13 determines that the subject image has a higher brightness level than the one obtained in the standard state. On receipt of the result V13 thus obtained, the imaging system controller 5 sets the ratio in length between the signal transmission period 6 and the idle period 7 to be 1:0. Namely, the imaging system controller 5 outputs a signal VCA, which commands to stop the intermittent driving to thereafter shift to the normal driving, to the timing generator 2. On the other hand, when the output signal from the CDS circuit 15 for providing the brightness level of the subject image drops to a value that is equal to or less than the threshold value ths0, the signal level detector 13 determines that the subject image is in shooting conditions of lower brightness level. On receipt of the result V13 thus obtained, the imaging system controller 5 sets the ratio in length between the signal transmission period 6 and the idle period 7 to be 1:3. By extending the idle period 7 in this manner, the imaging system controller 5 or the timing generator 2 extends the exposure time in the imaging element 1, to increase the amount of accumulated charges.

As described, the length of the idle period 7 is adjusted or controlled in three levels according to the output level from the CDS circuit 15. As a result, the ratio in length between the signal transmission period 6 and the idle period 7 can be controlled on the basis of the brightness level of the subject image. In other words, according to the conditions of the subject during shooting, the length of the idle period 7 can be optimally adjusted.

Figure 10:
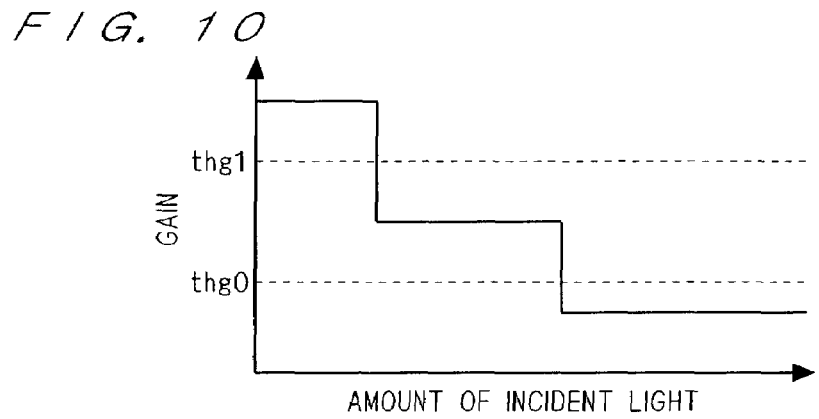
FIG. 10 is a graph showing an exemplary gain characteristic relative to brightness (the amount of incident light)

Alternatively, the brightness level may be determined using the signal for providing the amount of gain of the AGC circuit 16 in FIG. 3 as the signal V2A. Such alternative is shown in FIG. 10. FIG. 10 shows the exemplary gain characteristic of the AGC circuit 16. The characteristic shown therein differs depending on the system configuration.

As seen from FIG. 10, the gain characteristic of the AGC circuit 16 is varied in three levels according to the amount of incident light. In FIG. 10, the signal level detector 13 is shown to have two threshold values thg1 and thg0 with respect to the above-mentioned gain characteristic. Similar to the example shown in FIG. 9, the state where the gain of the AGC circuit 16 ranges between the threshold values thg1 and thg0 is defined as a standard state for adjusting the length of the idle period 7. When the gain of the AGC circuit 16 reaches a value that is equal to the threshold value thg1 or more, or equal to the threshold value thg0 or less, the imaging system controller 5 changes the ratio in length between the signal transmission period 6 and the idle period 7 as determined in the normal state. As a result, using the amount of gain of the AGC circuit 16, the length of the idle period 7 can be also suitably adjusted in three levels according to the conditions of the subject during shooting.

In FIGS. 9 and 10, the signal level detector 13 is shown to have two threshold values respectively. However, the second preferred embodiment is still applicable even with the arbitrary number of these threshold values.

Still alternatively, the picked-up image signal V2 itself outputted from the signal processing circuit 18 can be used as the signal V2A. In this case, the first and second output terminals of the picked-up image signal processor 3 are the same.

Third Preferred Embodiment

In the first preferred embodiment (including the modification thereof) and the second preferred embodiment of the present invention, the exemplary system configuration of the imaging device employing an intermittent driving method has been discussed. According to this intermittent driving method, charges accumulated in the imaging element are transferred in the signal transmission period and in the subsequent idle period, transfer of the accumulated charges is suspended. In the third preferred embodiment of the present invention, the imaging device according to the first preferred embodiment (including the modification thereof) or to the second preferred embodiment is applied to a portable terminal such as a mobile computer. For the sake of convenience, a portable terminal equipped with the imaging device 10 according to the first preferred embodiment will be discussed below.

Figure 11:
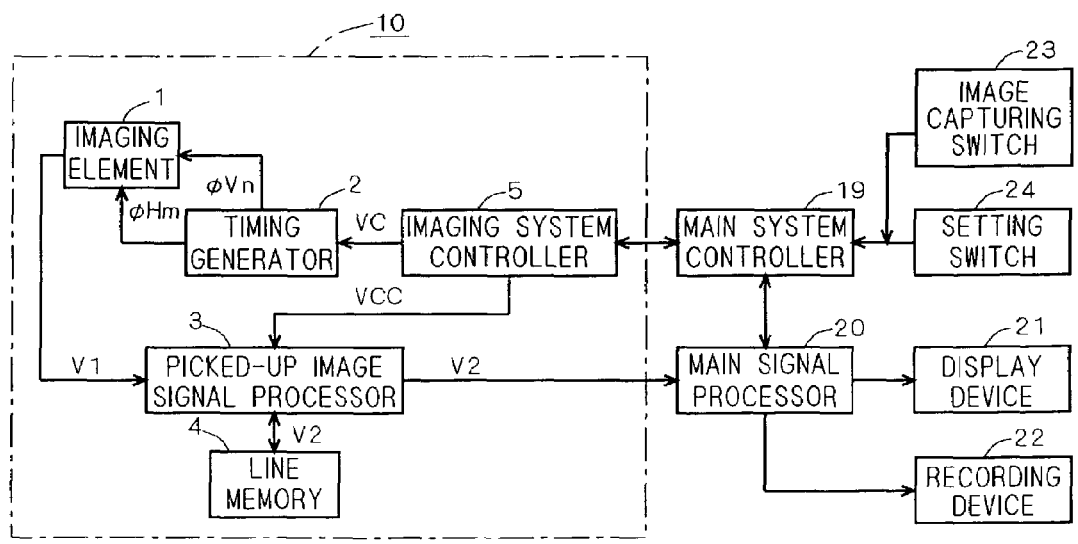
FIG. 11 is a block diagram illustrating the configuration of a portable terminal according to a third preferred embodiment of the present invention.

FIG. 11 is a block diagram illustrating the system configuration of the portable terminal device including the imaging device 10 given in FIG. 1. In FIG. 11, a main system controller 19 is a core section for performing the schedule administration for the portable terminal device. A main signal processor 20 performs predetermined signal processings on the picked-up image signal V2 transmitted from the picked-up image signal processor 3. More particularly, the signal processings in the main signal processor 20 include (1) in a monitor mode, a processing for converting the picked-up image signal V2 into a monitor moving picture signal (display data) suitably applicable for display on a to-be-described display device 21, and (2) in a record mode, a processing for converting the picked-up image signal V2 into a record signal suitably applicable for recording on a to-be-described recording device 22. The display device 21 is a flat panel display (FPD) which may be a liquid crystal display (LCD), or alternatively, an organic or inorganic EL display. The display data outputted from the main signal processor 20 is displayed on the display device 21. The recording device 22 records the record signal outputted from the main signal processor 20 on a memory element such as a flash memory. In response to the operation by a user, an image capturing switch 23 outputs an imaging command signal to the main system controller 19. Further, a setting switch 24 is operable to determine the number of pixels to be stored in the recording device 22, to determine whether the imaging device 10 should be brought to an operating state, and to control the state of the portable terminal device.

First, when the image capturing switch 23 of the portable terminal device is pressed, the main system controller 19 outputs the imaging command signal which commands or demands to start imaging of the subject into the imaging system controller 5. On receipt of this signal outputted from the main system controller 19, the imaging system controller 5 executes imaging according to the foregoing intermittent driving. After completion of the imaging, the imaging system controller 5 issues a demand to the main system controller 19 in order to start data transmission of the picked-up image signal V2. On receipt of this demand, the main system controller 19 determines whether or not the main signal processor 20 is in a state allowing receipt of the picked-up image signal data. If the main signal processor 20 is in a state allowing receipt of the data, the main system controller 19 transmits a data transmission command signal, which commands to start transmission of the picked-up image signal V2, to the imaging system controller 5. On receipt of this signal, the imaging system controller 5 controls reading of the picked-up image signal data by the picked-up image signal processor 3. As a result, the main signal processor 20 receives the picked-up image signal V2 outputted and transmitted from the picked-up image signal processor 3.

When the data of the picked-up image signal V2 is transmitted from the picked-up image signal processor 3 to the main signal processor 20 at a speed lower than the reading clock of the line memory 4 in the imaging system 10, the imaging system controller 5 sets and maintains the length of the idle period 7 to be the same as that of the data transmission period of the picked-up image signal V2. The data transmission of the picked-up image signal V2 can be thus handled only by the line memory 4, requiring no frame memory having a memory capacity corresponding to all the pixels of the imaging element 1.

In the monitor mode before the image capturing switch 23 is pressed, the user selects the subject and determines the angle of view of the subject, for example. When the number of pixels in the display device 21 is sufficiently smaller than that in the imaging element 1 and the transmission speed of the picked-up image signal V2 from the picked-up image signal processor 3 to the main signal processor 20 is lower than the transfer clock (reading clock) of the imaging element 1, the imaging system controller 5 controls the system to shift to the normal driving having no idle period. The frame frequency is increased accordingly, namely, the length of the frame period is shortened. The resolution of the data transmitted from the picked-up image signal processor 3 is thereby lowered enough to allow a monitor image to be displayed on the display device 21. As a result, the portable terminal device according to the third preferred embodiment realizes monitor mode allowing the subject to be monitored as a moving image.

When the image capturing switch 23 is pressed, on the other hand, the imaging device 10 is placed under conditions in which shooting of the subject is executed. The imaging system controller 5 then controls the system to shift to the intermittent driving as described. The frame frequency is decreased accordingly to such a degree that the picked-up image signal V2 has a desirable resolution for recording, and thereafter, the picked-up image signal V2 having such resolution is transmitted. As a result, the portable terminal device according to the third preferred embodiment realizes recording mode of data.

By the imaging system controller 5 executing the foregoing control (namely, shift between normal driving and intermittent driving), the picked-up image signal data which is optimally controlled for both the monitor mode and the record mode can be transmitted. As a result, the display device 21 allows high-quality display.

Figure 12:
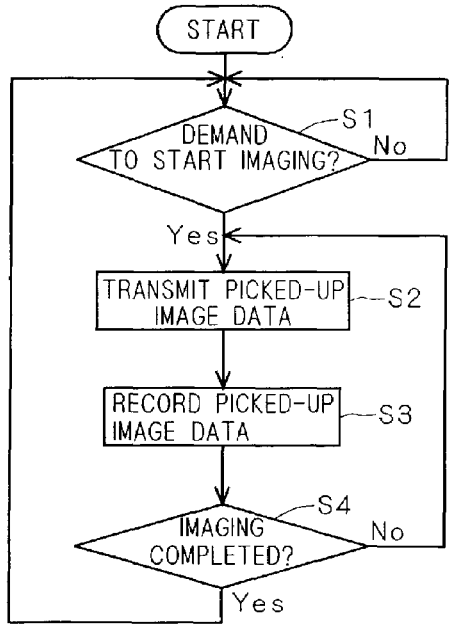
FIG. 12 is a flowchart showing the operations of the portable terminal according to the third preferred embodiment of the present invention.

FIG. 12 is a flowchart showing the sequence of the operations of the portable terminal device according to the third preferred embodiment, namely, the operations determining the states in the monitor mode and the record mode, and then shifting the driving method between normal driving (with no idle period) and intermittent driving (with idle period).

First, by the time the image capturing switch 23 is pressed, the imaging system controller 5 is in the state of waiting a demand to start imaging (step S1). At this time, the imaging system controller 5 outputs the control signal VC, which commands to control the transfer of accumulated charges in the image element 1 by the normal driving method, to the timing generator 2. The picked-up image signal processor 3 thereby performs the signal processings on the accumulated charges V1 transmitted by the normal driving method, and outputs the resultant picked-up image signal V2 to the main signal processor 20. As a result, the system is placed in the monitor mode in which a moving picture having an exemplary frame rate of 20 fps is displayed on the display device 21 of an exemplary size including 160×120 pixels.

Next, when the image capturing switch 23 is pressed, the main system controller 19 issues a demand to start imaging. On receipt of this command, the imaging system controller 5 outputs the control signal VC, which commands so as to transfer accumulated charges in the imaging element 1 by the intermittent driving method, to the timing generator 2. The picked-up image signal processor 3 thereby performs the above-mentioned signal processings on the accumulated charges V1 intermittently transmitted thereto, and outputs the resultant picked-up image signal V2 to the main signal processor 20 (step S2).

At this time, when the imaging element 1 has a resolution of 640×480 pixels, the frame rate is reduced to a value that is one-sixteenth the value of the frame rate of 20 fps in the monitor mode, namely, about 1 fps. Data transmission of the picked-up image signal V2 is thereby allowed.

In the subsequent step S3, the main signal processor 20 performs a signal processing on the received picked-up image signal V2 for converting the same into record data, and records the obtained data on the recording device 22. The steps S2 through S4 (step judging completion of imaging) are repeatedly performed until imaging is completed.

When data of the picked-up image signal V2 is completely transmitted to the main signal processor 20 and then the imaging is completed, the sequence returns to the step S1.

According to the operations described so far, while maintaining display quality, it is allowed to display a moving picture in the monitor mode and transmit data having a large number of pixels (still picture) in the record mode. The moving picture data of low resolution displayed in the monitor mode may be recorded in the record mode.

As described, even when the transmission speed of the picked-up image signal is lower than the reading speed of the picked-up image signal in the imaging device, the third preferred embodiment produces the following result (1). That is, transmission of the picked-up image signal can be handled only by the line memory without the necessity of providing a frame memory having a capacity corresponding to all the pixels of the imaging element.

The third preferred embodiment further produces the following result (2). That is, in the monitor mode, a moving picture having a resolution suitable for this mode can be displayed, and in the record mode, data can be recorded with a desirable resolution.

Figure 17:
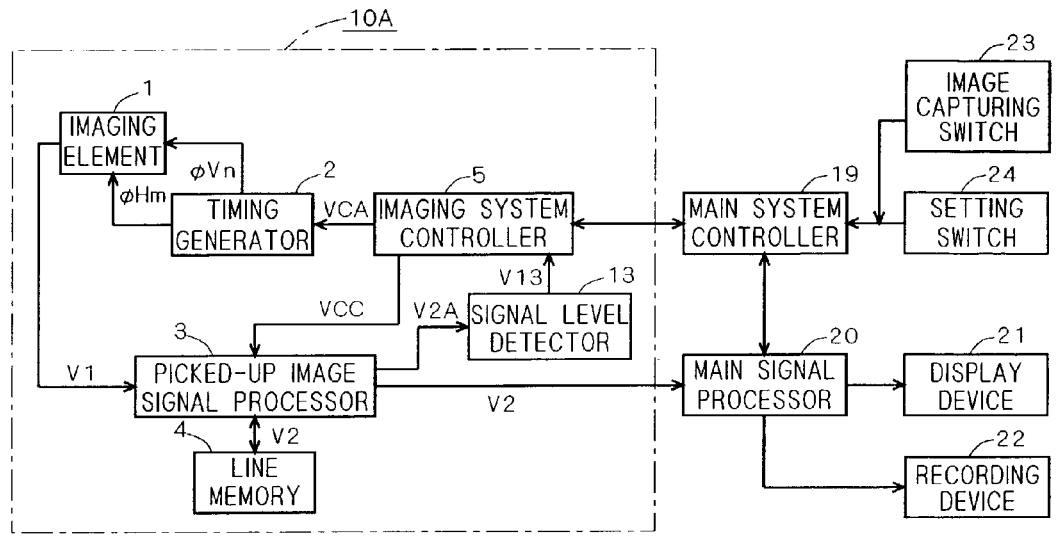
FIG. 17 is a block diagram illustrating the configuration of the portable terminal according to the third preferred embodiment of the present invention equipped with the imaging device shown in FIG. 8.

The exemplary configuration of the third preferred embodiment equipped with the imaging device 10A according to the second preferred embodiment (FIG. 8) is illustrated in FIG. 17. The fundamental operations of this system are the same as those described so far.

Fourth Preferred Embodiment

The fourth preferred embodiment of the present invention relates to a portable terminal including wireless communications (such as portable phone, PDA, or portable television) equipped with the imaging device according to the first preferred embodiment (including the modification thereof) or to the second preferred embodiment. In the following description on the basis of the accompanying drawings, the first preferred embodiment is applied for the sake of convenience to the portable terminal including wireless communications.

Figure 13:
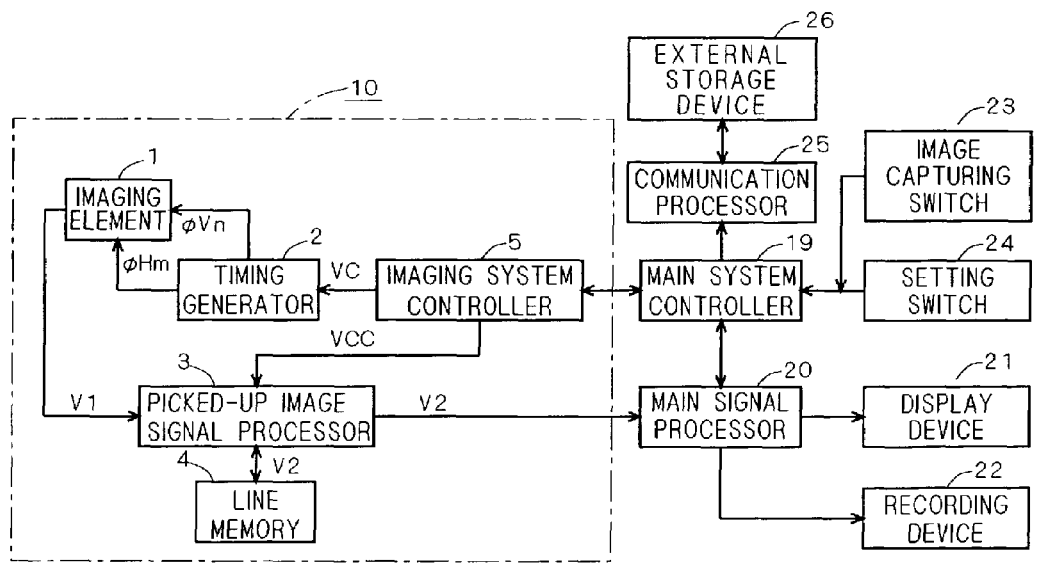
FIG. 13 is a block diagram illustrating the configuration of a portable terminal according to a fourth preferred embodiment of the present invention.
Figure 16:
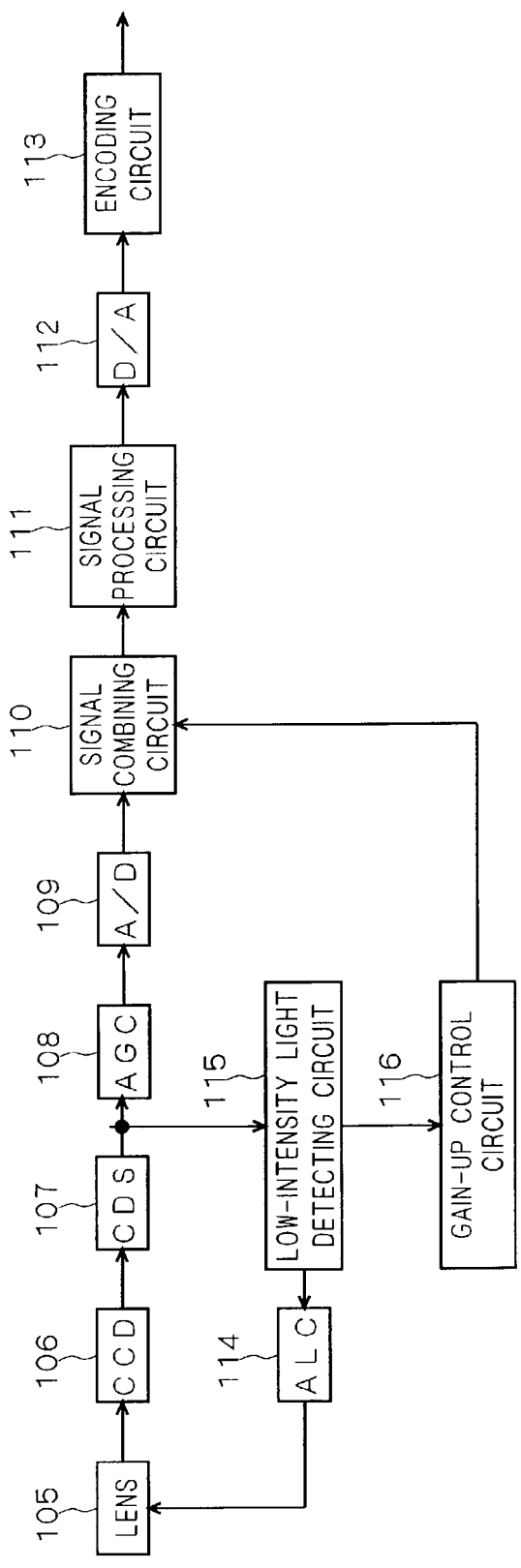
FIG. 16 is a block diagram illustrating the configuration of an imaging device in the prior art.

FIG. 13 is a block diagram illustrating the exemplary configuration of the system employing the portable phone including wireless communications. In FIG. 13, except for a communication processor 25 and an external storage device 26 newly added thereto, the other constituent elements are the same as those in FIG. 11 and denoted by the same reference numerals. The communication processor 25 is connected to the main signal processor 20 through the main system controller 19. Subject to the control by the main system controller 19, the communication processor 25 transmits the picked-up image data of the subject received from the main signal processor 20 into the external storage device 26 through wireless communications. Then the external storage device 26 stores the data of the picked-up image transmitted thereto through communications with the portable phone. The system may be configured without the external storage device 26.

In the communication devices such as portable phones, a fundamental frequency of a system clock may vary by the influence such as condition of reception. As a countermeasure against this, a system clock in the main system controller 19 can be also employed as the driving clocks, or as the transfer clocks $\phi Vn$ and $\phi Hm$ of the imaging element 1. In this configuration, the imaging device 10 does not require a plurality of oscillators and PLL circuits therein for generating the transfer clocks $\phi Vn$ and $\phi Hm$ of the imaging element 1, thus readily realizing the portable phone equipped with the imaging device 10.

In the configuration shown in FIG. 13, the length of the idle period 7 is determined in response to the transmission speed of the foregoing data of the picked-up image from the communication processor 25 to the external storage device 26. More particularly, when the speed at which data is transmitted from the communication processor 25 to the external storage device 26 is lower than the speed at which data is transmitted from the picked-up image signal processor 3 to the main signal processor 20, the imaging system controller 5 sets the length of the idle period 7 to be suitably applicable for the data transmission speed between the communication processor 25 and the external storage device 26, and then controls the timing generator 2 to induce transmission of the accumulated charges V1 from the imaging element 1 by the intermittent driving method. According to the configuration described so far, without the necessity of providing a mass storage region in the portable phone, the data of the picked-up image obtained from the picked-up image signal V2 can be reliably transmitted to and recorded on the external storage device 26.

Figure 18:
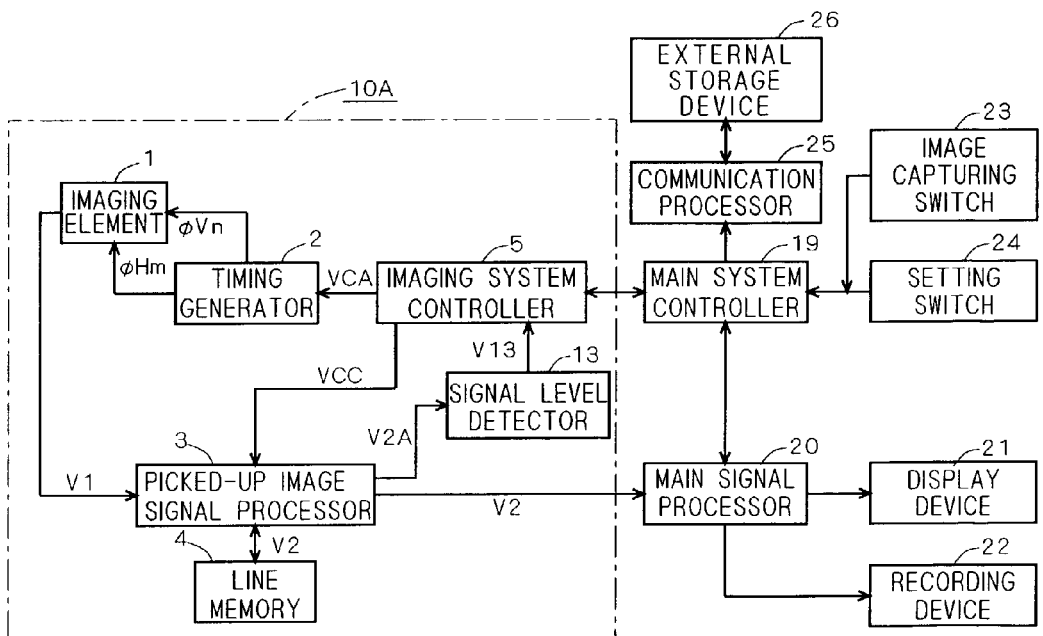
FIG. 18 is a block diagram illustrating the configuration of the portable terminal according to the fourth preferred embodiment of the present invention equipped with the imaging device shown in FIG. 8.

The exemplary configuration of the fourth preferred embodiment equipped with the imaging device 10A according to the second preferred embodiment (FIG. 8) is shown in FIG. 18. The fundamental operations, functions and effects are the same as those described so far.

While the invention has been shown and described in detail, the foregoing description is in all aspects illustrative and not restrictive. It is therefore understood that numerous modifications and variations can be devised without departing from the scope of the invention.

What is claimed is:

1. An imaging device, comprising:

an imaging element configured to accumulate charges obtained by photoelectric conversion of incident light providing an image of a subject, said imaging element transmitting accumulated charges to an output terminal in response to a vertical transfer clock and a horizontal transfer clock, and outputting said accumulated charges from said output terminal;

a picked-up image signal processor having an input terminal connected to said output terminal of said imaging element, and an output terminal, said picked-up image signal processor performing predetermined signal processings on said accumulated charges received at said input terminal thereof, and outputting a resultant signal as a picked-up image signal from said output terminal thereof, an imaging system controller having an output terminal, said imaging system controller outputting a control signal from said output terminal thereof, said control signal giving a command to generate and output said vertical transfer clock and said horizontal transfer clock in a signal transmission period, a command to suspend output of said vertical transfer clock and said horizontal transfer clock in an idle period subsequent to said signal transmission period, and a command to periodically repeat said signal transmission period and said idle period a number of times corresponding to the number of horizontal lines of said imaging element, and when said image of a subject is determined to have a relatively high brightness level on the basis of said picked-up image signal, said imaging system controller sets said idle period to have a shorter response time length; and a timing generator having an input terminal connected to said output terminal of said imaging system controller, and an output terminal connected to said imaging element, said timing generator generating and outputting said vertical transfer clock and said horizontal transfer clock from said output terminal thereof in said signal transmission period, and suspending output of said vertical transfer clock and said horizontal transfer clock in said idle period in response to said control signal received at said input terminal thereof wherein the length of said idle period is n times (n is a natural number) the length of said signal transmission period.

2. The imaging device according to claim 1, wherein said imaging system controller further outputs a signal as said control signal, said control signal giving a command to generate and output only said horizontal transfer clock in a dummy period, said timing generator generates and outputs only said horizontal transfer clock in said dummy transmission period in response to said control signal, and said dummy transmission period is provided in said idle period and immediately before said signal transmission period subsequent to said idle period.

3. The imaging device according to claim 1, wherein said imaging system controller has said output terminal as a first output terminal, said imaging system controller further having a second output terminal, said picked-up image signal processor has said input terminal as a first input terminal, said picked-up image signal processor further having a second input terminal connected to said second output terminal of said imaging system controller, and a data writing and reading terminal, said imaging device further comprises a line memory connected to said data writing and reading terminal of said picked-up image signal processor, said imaging system controller outputs a writing and reading clock signal from said second output terminal thereof, said writing and reading clock signal giving a command to store said picked-up image signal in said line memory in said signal transmission period, and a command to start reading of said picked-up image signal from said line memory to be timed to an arbitrary instant in a frame period, said writing and reading clock signal further giving a command to finish said reading of said picked-up image signal in said frame period, said picked-up image signal processor performs writing and reading of said picked-up image signal to and from said line memory to be timed to said writing and reading clock signal, and said frame period corresponds to a sum of said signal transmission period and said idle period.

4. A portable terminal, comprising:

the imaging device as recited in claim 3;

a main system controller configured to output an imaging command signal and a data transmission command signal to said imaging system controller, said imaging command signal giving a command to start imaging of said subject, and said data transmission command signal giving a command to start transmission of said picked-up image signal after completion of imaging of said subject; and a main signal processor configured to receive said picked-up image signal outputted from said picked-up image signal processor, and to perform predetermined signal processings on said picked-up image signal, wherein said idle period is controlled to have a length that is the same as a time period for transmitting said picked-up image signal to said main signal processor.

5. The portable terminal according to claim 4, further comprising:

a display device connected to said main signal processor; and a recording device connected to said main signal processor, wherein in a monitor mode where no output of said imaging command signal occurs from said main system controller to said imaging system controller, said imaging system controller provides no idle period and controls imaging of said subject and transmission of said picked-up image signal by normal driving, and in a record mode where said imaging command signal is outputted from said main system controller to said imaging system controller, said imaging system controller provides said idle period and controls imaging of said subject and transmission of said picked-up image signal by intermittent driving.

6. The portable terminal according to claim 5, further comprising: a communication processor connected to said main signal processor through said main system controller, said communication processor handling wireless communications with an external storage device, said external storage device recording picked-up image data of said subject, wherein
the length of said idle period is determined in response to a speed at which said picked-up image data is transmitted from said communication processor to said external storage device.

7. An imaging device, comprising:
an imaging element configured to accumulate charges obtained by photoelectric conversion of incident light providing an image of a subject, said imaging element transmitting accumulated charges to an output terminal in response to a vertical transfer clock and a horizontal transfer clock, and outputting said accumulated charges from said output terminal;
a picked-up image signal processor having an input terminal connected to said output terminal of said imaging element, and first and second output terminals, said picked-up image signal processor performing predetermined signal processings on said accumulated charges received at said input terminal thereof, and outputting a resultant signal as a picked-up image signal from said first output terminal thereof, said picked-up image signal processor further outputting a signal from said second output terminal thereof, said signal being obtained in the course of said predetermined signal processings and required for determining brightness level of said subject;
an imaging system controller having an input terminal and an output terminal, said imaging system controller outputting a control signal from said output terminal thereof, said control signal giving a command to generate and output said vertical transfer clock and said horizontal transfer clock in a signal transmission period, a command to suspend output of said vertical transfer clock and said horizontal transfer clock in an idle period subsequent to said signal transmission period, and a command to periodically repeat said signal transmission period and said idle period a number of times corresponding to the number of horizontal lines of said imaging element, and when said image of a subject is determined to have a relatively high brightness level on the basis of said picked-up image signal, said imaging system controller sets said idle period to have a shorter response time length;
a timing generator having an input terminal connected to said output terminal of said imaging system controller, and an output terminal connected to said imaging element, said timing generator generating and outputting said vertical transfer clock and said horizontal transfer clock from said output terminal thereof in said signal transmission period, and suspending output of said vertical transfer clock and said horizontal transfer clock in said idle period in response to said control signal received at said input terminal thereof; and
a signal level detector having an input terminal connected to said second output terminal of said picked-up image signal processor and an output terminal connected to said input terminal of said imaging system controller, said signal level detector detecting said brightness level of said subject on the basis of said signal received at said input terminal thereof, and outputting a result of detection from said output terminal thereof, wherein
the length of said idle period is n times (n is an integer of 0 or more) the length of said signal transmission period, and
said imaging system controller controls the length of said idle period on the basis of said result of detection received at said input terminal thereof.

8. The imaging device according to claim 7, wherein
said imaging system controller has said output terminal as a first output terminal, said imaging system controller further having a second output terminal,
said picked-up image signal processor has said input terminal as a first input terminal, said picked-up image signal processor further having a second input terminal connected to said second output terminal of said imaging system controller, and a data writing and reading terminal,
said imaging device further comprises a line memory connected to said data writing and reading terminal of said picked-up image signal processor,
said imaging system controller outputs a writing and reading clock signal from said second output terminal thereof, said writing and reading clock signal giving a command to store said picked-up image signal in said line memory in said signal transmission period, and a command to start reading of said picked-up image signal from said line memory to be timed to an arbitrary instant in a frame period, said writing and reading clock signal further giving a command to finish said reading of said picked-up image signal in said frame period,
said picked-up image signal processor performs writing and reading of said picked-up image signal to and from said line memory to be timed to said writing and reading clock signal, and
said frame period corresponds to a sum of said signal transmission period and said idle period.

9. A portable terminal, comprising:
the imaging device as recited in claim 8;
a main system controller configured to output an imaging command signal and a data transmission command signal to said imaging system controller, said imaging command signal giving a command to start imaging of said subject, and said data transmission command signal giving a command to start transmission of said picked-up image signal after completion of imaging of said subject; and
a main signal processor configured to receive said picked-up image signal outputted from said picked-up image signal processor, and to perform predetermined signal processings on said picked-up image signal, wherein
said idle period is controlled to have a length that is the same as a time period for transmitting said picked-up image signal to said main signal processor.

10. The portable terminal according to claim 9, further comprising:
a display device connected to said main signal processor; and
a recording device connected to said main signal processor, wherein
in a monitor mode where no output of said imaging command signal occurs from said main system controller to said imaging system controller, said imaging system controller provides no idle period and controls imaging of said subject and transmission of said picked-up image signal by normal driving, and in a record mode where said imaging command signal is outputted from said main system controller to said imaging system controller, said imaging system controller provides said idle period and controls imaging of said subject and transmission of said picked-up image signal by intermittent driving.

11. The portable terminal according to claim 10, further comprising:
a communication processor connected to said main signal processor through said main system controller, said communication processor handling wireless communications with an external storage device, said external storage device recording picked-up image data of said subject, wherein
the length of said idle period is determined in response to a speed at which said picked-up image data is transmitted from said communication processor to said external storage device.

12. An imaging device, comprising:
an imaging element for accumulating charges obtained by photoelectric conversion of incident light providing an image of a subject, said imaging element transmitting accumulated charges to an output terminal in response to a vertical transfer clock and a horizontal transfer clock, and outputting said accumulated charges from said output terminal;
picked-up image signal processing means having an input terminal connected to said output terminal of said imaging element, and an output terminal, said picked-up image signal processing means performing predetermined signal processings on said accumulated charges received from said input terminal thereof, and outputting a resultant signal as a picked-up image signal from said output terminal thereof;
imaging system control means having an output terminal, said imaging system control means outputting a control signal from said output terminal thereof, said control signal giving a command to generate and output said vertical transfer clock and said horizontal transfer clock in a signal transmission period, a command to suspend output of said vertical transfer clock and said horizontal transfer clock in an idle period subsequent to said signal transmission period, and a command to periodically repeat said signal transmission period and said idle period a number of times corresponding to the number of horizontal lines of said imaging element, and when said image of a subject is determined to have a relatively high brightness level on the basis of said picked-up image signal, said imaging system controller sets said idle period to have a shorter response time length; and
timing generating means having an input terminal connected to said output terminal of said imaging system control means, and an output terminal connected to said imaging element, said timing generating means generating and outputting said vertical transfer clock and said horizontal transfer clock from said output terminal thereof in said signal transmission period, and suspending output of said vertical transfer clock and said horizontal transfer clock in said idle period in response to said control signal received at said input terminal thereof, wherein
the length of said idle period is n times (n is a natural number) the length of said signal transmission period.

* * * * *